(12) United States Patent
Choi

(10) Patent No.: US 9,732,679 B2
(45) Date of Patent: Aug. 15, 2017

(54) ENGINE FOR PERFORMING CDA

(71) Applicant: HYUNDAI MOTOR COMPANY, Seoul (KR)

(72) Inventor: Byong Young Choi, Bucheon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 182 days.

(21) Appl. No.: 14/559,751

(22) Filed: Dec. 3, 2014

(65) Prior Publication Data
US 2016/0090921 A1    Mar. 31, 2016

(30) Foreign Application Priority Data

Sep. 30, 2014 (KR) .................. 10-2014-0131642

(51) Int. Cl.
| | |
|---|---|
| F01L 1/14 | (2006.01) |
| F02D 13/06 | (2006.01) |
| F01L 1/344 | (2006.01) |
| F01L 1/047 | (2006.01) |
| F01L 13/00 | (2006.01) |

(52) U.S. Cl.
CPC ............. *F02D 13/06* (2013.01); *F01L 1/047* (2013.01); *F01L 1/34413* (2013.01); *F01L 13/0005* (2013.01); *F01L 13/0036* (2013.01); *F01L 1/344* (2013.01); *F01L 2013/001* (2013.01); *F01L 2013/0052* (2013.01); *F01L 2820/031* (2013.01); *Y02T 10/18* (2013.01)

(58) Field of Classification Search
CPC .. F02D 13/06; F02D 13/0234; F01L 1/34413; F01L 1/047
See application file for complete search history.

(56) References Cited

U.S. PATENT DOCUMENTS

| | | | |
|---|---|---|---|
| 2007/0034184 A1* | 2/2007 | Dengler | F01L 1/08 123/90.17 |
| 2007/0235005 A1* | 10/2007 | Lewis | F01L 9/04 123/322 |

FOREIGN PATENT DOCUMENTS

| | | |
|---|---|---|
| KR | 10-2007-0062793 A | 6/2007 |
| KR | 10-2009-0064099 A | 6/2009 |
| WO | 2011/067865 A1 | 6/2011 |

* cited by examiner

*Primary Examiner* — Zelalem Eshete
(74) *Attorney, Agent, or Firm* — McDermott Will & Emery LLP

(57) ABSTRACT

An engine that can implement cylinder deactivation (CDA) includes: a plurality of cylinders; a variable valve duration apparatus that is mounted in at least one of the plurality of cylinders and that performs a long duration mode and a short duration mode of an intake valve of a corresponding cylinder; a CDA apparatus that is mounted in at least another one of the plurality of cylinders and that performs a general operation mode and a CDA mode of an intake valve and an exhaust valve of a corresponding cylinder; and a controller that controls operation of the variable valve duration apparatus and the CDA apparatus according to an operation state of an engine, wherein the controller controls the variable valve duration apparatus to operate in a short duration mode, when the CDA apparatus operates in the CDA mode.

11 Claims, 15 Drawing Sheets

ENGINE FOR PERFORMING CDA

CROSS-REFERENCE TO RELATED APPLICATION

This application claims priority to Korean Patent Application No. 10-2014-0131642 filed in the Korean Intellectual Property Office on Sep. 30, 2014, the entire contents of which are incorporated herein by reference.

TECHNICAL FIELD

The present disclosure relates to an engine that can implement cylinder deactivation (CDA). More particularly, the present disclosure relates to an engine in which a CDA operation area is extended.

BACKGROUND

An internal combustion engine injects fuel and air into a combustion chamber and burns the injected fuel and air, thereby generating power. When taking in air, the internal combustion engine operates an intake valve by driving a camshaft, and while the intake valve is opened, the internal combustion engine takes air into the combustion chamber. Further, by driving the camshaft, the internal combustion engine operates an exhaust valve, and while the exhaust valve is opened, the internal combustion engine exhausts air from the combustion chamber.

Currently, in order to improve fuel consumption of such a vehicle engine, research that applies cylindrical deactivation (CDA) is being performed.

In order to implement a CDA mode, by deactivating an intake/exhaust valve (VDA), a pumping loss can be minimized.

In general, when the CDA mode is implemented, intake valves or intake valves and exhaust valves of some cylinders are deactivated, and intake/exhaust valves of the other cylinders are activated.

FIG. 15 is a graph illustrating a valve profile when converting an operation mode of a general engine that can implement the CDA, and represents a profile of an intake/exhaust valve of a cylinder that is not deactivated.

In the drawing, K represents a profile of an exhaust valve, M represents a valve profile of an intake valve upon general operation, X represents top dead center, and Y represents bottom dead center.

When an engine load is changed from a high load to a low load, an operation mode of the engine is changed from a general operation mode to the CDA mode, and in order to increase an intake air amount, by moving closing timing of an intake valve to be adjacent to bottom dead center, an intake valve profile is moved from M to L.

In this case, as a valve overlapping segment in which an intake valve and an exhaust valve are simultaneously open increases, an internal EGR gas amount increases within a combustion chamber, and a knocking occurrence possibility increases due to a temperature increase of the combustion chamber and thus fuel consumption of the engine is reduced.

Due to such a phenomenon, there is a problem that an area of deactivation of some cylinders is limited.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an engine that can implement CDA and in which a CDA operation area is extended.

An exemplary embodiment of the present invention provides an engine that can implement cylinder deactivation (CDA), including: a plurality of cylinders; a variable valve duration apparatus that is mounted in at least one of the plurality of cylinders and that performs a long duration mode and a short duration mode of an intake valve of a corresponding cylinder; a CDA apparatus that is mounted in at least another one of the plurality of cylinders and that performs a general operation mode and a CDA mode of an intake valve and an exhaust valve of a corresponding cylinder; and a controller that controls operation of the variable valve duration apparatus and the CDA apparatus according to an operation state of an engine, wherein the controller controls the variable valve duration apparatus to operate in a short duration mode, when the CDA apparatus operates in the CDA mode.

The engine may include first, second, third, and fourth cylinders sequentially disposed, the CDA apparatus may be provided in the second and third cylinders or the first and fourth cylinders, and the variable valve duration apparatus may be provided in the first and fourth cylinders or the second and third cylinders.

The engine may further include a variable valve timing controller that varies valve timing of an intake valve of each cylinder, and the controller may control operation of the valve timing controller and may control the CDA apparatus to operate in the CDA mode, control the variable valve duration apparatus to operate in the short duration mode, when an operation state of the engine is changed from a predetermined first high load state to a predetermined low load state.

The controller may delay operation of the variable valve timing controller when an operation state of the engine is changed from the predetermined low load state to a predetermined second high load state.

The controller may control the CDA apparatus to operate in the general operation mode and control the variable valve duration apparatus to operate in the long duration mode when an operation state of the engine is changed to a predetermined third high load state.

Another embodiment of the present invention provides an engine that can perform cylinder deactivation (CDA) including: a plurality of cylinders; an intake camshaft; an intake CDA/variable valve duration apparatus that is provided in the intake camshaft to perform a general operation mode and a CDA mode of an intake valve of one cylinder of the plurality of cylinders and to implement a long duration mode and a short duration mode of an intake valve of a cylinder neighboring the cylinder; and a controller that controls operation of the intake CDA/variable valve duration apparatus according to an operation state of the engine.

The engine may further include a variable valve timing controller that varies valve timing of the intake valve of each cylinder, wherein the controller may control operation of the valve timing controller and delay timing of the intake valve by operating the intake CDA/variable valve timing controller when an operation state of the engine is changed to a predetermined high load state, in a state in which the intake CDA/variable valve duration apparatus operates to implement the CDA mode and the short duration mode.

The intake CDA/variable valve duration apparatus may include: a first cam unit that can move in an axial direction of the intake camshaft on the intake camshaft and that rotates together with the intake camshaft, and in which a first long duration cam and a first short duration cam are formed at one side thereof and in which a first general cam and a first CDA cam are formed at the other side thereof; a first solenoid that selectively moves the first cam unit in a first direction; a second cam unit that can move in an axial direction of the intake camshaft on the intake camshaft and that rotates together with the intake camshaft, and in which a second general cam and a second CDA cam are formed at one side thereof and in which a second long duration cam and a second short duration cam are formed at the other side thereof; a second solenoid that selectively moves the second cam unit in a second direction; and an interlocking unit that is disposed between the first and second cam units and that is moved by movement of the first cam unit or the second cam unit to push the second cam unit or the first cam unit, wherein the controller may control operation of the first solenoid or the second solenoid according to an operation state of the engine.

The first and second long duration cams, the first and second short duration cams, the first and second general cams, and the first and second CDA cams may be disposed in the order of the first short duration cam, the first long duration cam, the first CDA cam, the first general cam, the second CDA cam, the second general cam, the second short duration cam, and the second long duration cam.

In the first cam unit, a first guide groove that selectively inserts an operation rod of the first solenoid to push the first cam unit in a first direction may be formed, and in the second cam unit, a second guide groove that selectively inserts an operation rod of the second solenoid to push the second cam unit in a second direction may be formed.

The interlocking unit may include: an operation unit including first and second operation pins that protrude selectively; and a moving body having first and second moving grooves that selectively insert the first and second operation pins.

The first operation pin may be inserted into the first moving groove and the moving body may move to push the second cam unit when the first cam unit pushes the moving body, in a state in which the first operation pin is protruded.

The second operation pin may be inserted into the second moving groove and the moving body may move to push the first cam unit when the second cam unit pushes the moving body, in a state in which the second operation pin protrudes.

The operation unit may further include: an operation unit housing in which the first and second operation pins are mounted; and an intermediate pin that is hinge coupled to the operation unit housing and that has respective ends contacting the first and second operation pins and that enables either one of the first and second operation pins to protrude.

In the first and second cam units, first and second stopper grooves, respectively, may be formed, and the engine may further include a stopper unit that is selectively inserted into the stopper groove to prevent the first and second cam units from moving in an axial direction of the camshaft after an operation mode is changed.

The stopper unit may include: a stopper body that is selectively inserted into the first and second stopper grooves; and a stopper spring that elastically supports the stopper body.

The engine may be an engine in which first, second, third, and fourth cylinders are sequentially formed, a first long duration cam and a first short duration cam of the first cam unit may be disposed at the first cylinder, the first general cam and the first CDA cam may be disposed at the second cylinder, the second general cam and the second CDA cam may be disposed at the third cylinder, and the second long duration cam and the second short duration cam may be disposed at the fourth cylinder.

The engine may further include: an exhaust camshaft; and an exhaust CDA apparatus that implements a general operation mode and a CDA mode of an exhaust valve of the second and third cylinders and that opens and closes an exhaust valve of the first and fourth cylinders.

By an engine that can implement CDA according to an exemplary embodiment of the present invention, a CDA operation area can be extended, compared with a general engine that can implement CDA.

DETAILED DESCRIPTION OF THE EMBODIMENTS

Figure 1:
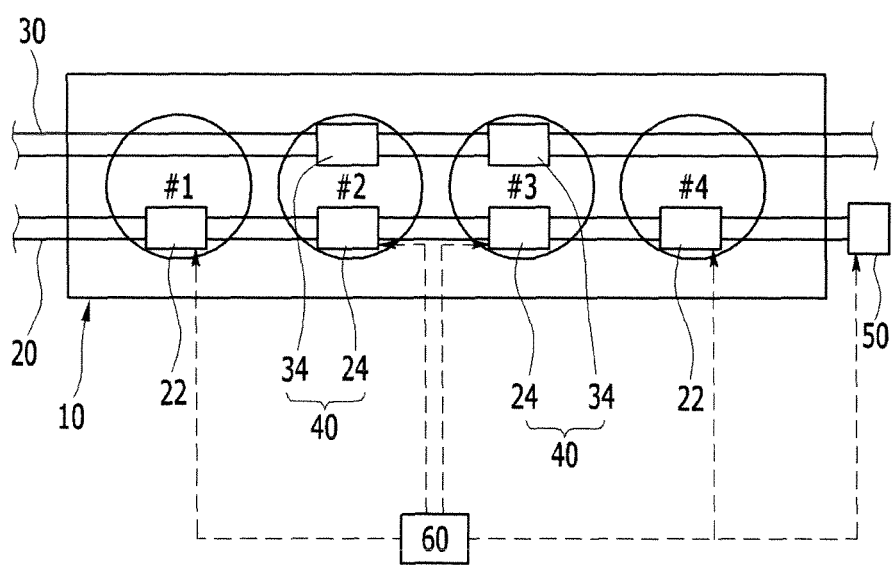
FIG. 1 is a diagram illustrating an engine that can implement CDA according to a first exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention Like reference numerals designate like elements throughout the specification.

In the drawings, the thickness of layers, films, panels, regions, etc., are exaggerated for clarity.

When it is said that any part, such as a layer, film, region, or plate, is positioned on another part, it means the part is directly on the other part or above the other part with at least one intermediate part.

In contrast, when an element is referred to as being "directly on" another element, there are no intervening elements present.

In addition, in an entire specification, unless explicitly described to the contrary, the word "comprise" and variations such as "comprises" or "comprising" will be understood to imply the inclusion of stated elements but not the exclusion of any other elements.

An exemplary embodiment of the present invention will hereinafter be described in detail with reference to the accompanying drawings.

FIG. 1 is a diagram illustrating an engine that can implement CDA according to a first exemplary embodiment of the present invention.

Referring to FIG. 1, an engine 10 that can implement CDA according to an exemplary embodiment or a plurality of exemplary embodiments of the present invention includes a variable valve duration apparatus 22 that is mounted to a plurality of cylinders #1, #2, #3, and #4 or at least one of the plurality of cylinders #1, #2, #3, and #4 and that implements a long duration mode and a short duration mode of an intake valve of a corresponding cylinder, a CDA apparatus 40 that is mounted to at least another one of the plurality of cylinders #1, #2, #3, and #4 and that implements a general operation mode and a CDA mode of an intake valve and an exhaust valve of a corresponding cylinder, and a controller 60 that controls operation of the variable valve duration apparatus 22 and the CDA apparatus 40 according to an operation state of the engine 10.

An intake camshaft 20 and an exhaust camshaft 30 are mounted to the engine 10, the variable valve duration apparatus 22 is mounted to change a duration of an intake valve of some of the plurality of cylinders #1, #2, #3, and #4, and two apparatuses 24 and 34 are mounted in the intake camshaft 20 and the exhaust camshaft 30, respectively, so that each of the CDA apparatus 40 changes opening and closing of an intake valve and an exhaust valve.

In the drawing, four cylinders #1, #2, #3, and #4 are shown, but an engine that can implement CDA according to a first exemplary embodiment of the present invention is not limited thereto and can be applied to various engines in which some cylinders are deactivated and in which the other cylinders are activated.

The engine 10 further includes a variable valve timing mechanism 50 that varies valve timing of an intake valve of the respective cylinders #1, #2, #3, and #4.

When the CDA apparatus 40 operates in the CDA mode, the controller 60 may control the variable valve duration apparatus 22 to operate in a short duration mode.

An operation mode of the CDA apparatus 40 and the variable valve duration apparatus 22 may be interlocked and changed. That is, when a mode of the CDA apparatus 40 is changed from the general mode to the CDA mode, an operation mode of the variable valve duration apparatus 22 is changed from a high lift mode to a low lift mode or from a long duration mode to a short duration mode.

The engine 10 is an engine sequentially including first, second, third, and fourth cylinders #1, #2, #3, and #4, the CDA apparatus 40 may be provided in the second and third cylinders #2 and #3 or the first and fourth cylinders #1 and #4, and the variable valve duration apparatus 22 may be provided in the first and fourth cylinders #1 and #4 or the second and third cylinders #2 and #3.

That is, as shown in the drawing, the CDA apparatus 40 may be provided in the second and third cylinders #2 and #3, and the variable valve duration apparatus 22 may be provided in the first and fourth cylinders #1 and #4.

Alternatively, the CDA apparatus 40 may be provided in the first and fourth cylinders #1 and #4, and the variable valve duration apparatus 22 may be provided in the second and third cylinders #2 and #3.

Hereinafter, for convenience of understanding, it is described that the CDA apparatus 40 is provided in the second and third cylinders #2 and #3, and the variable valve duration apparatus 22 is provided in the first and fourth cylinders #1 and #4.

Figure 2A:
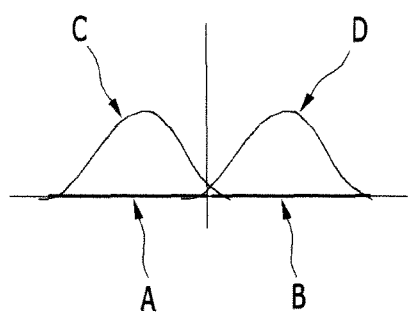
FIGS. 2(A) and 2(B) are graphs illustrating a valve profile of an engine that can implement CDA according to a first exemplary embodiment of the present invention.
Figure 2B:
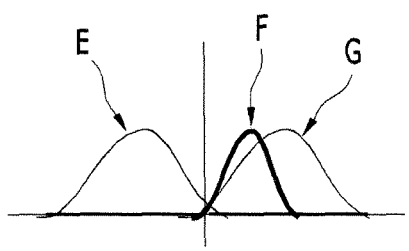

FIGS. 2(A) and 2(B) are graphs illustrating a valve profile of an engine that can implement CDA according to a first exemplary embodiment of the present invention.

In FIG. 2(A), a valve profile of a cylinder, for example, the second and third cylinders #2 and #3 that can be deactivated is shown.

In FIG. 2(B), A represents a profile of an exhaust valve when the second and third cylinders #2 and #3 are deactivated, B represents a profile of an intake valve when the second and third cylinders #2 and #3 are deactivated, C represents a profile of an exhaust valve of a general operation mode of the second and third cylinders #2 and #3, and D represents a profile of an intake valve of a general operation mode.

In FIG. 2(B), a valve profile of a cylinder that is not deactivated, for example, the first and fourth cylinders #1 and #4 is shown.

In FIG. 2(B), E represents a profile of an exhaust valve of the first and fourth cylinders #1 and #4, G represents a profile of an intake valve at a long duration of the first and fourth cylinders #1 and #4, and F represents a profile of an intake valve at a short duration of the first and fourth cylinders #1 and #4.

Figure 3:
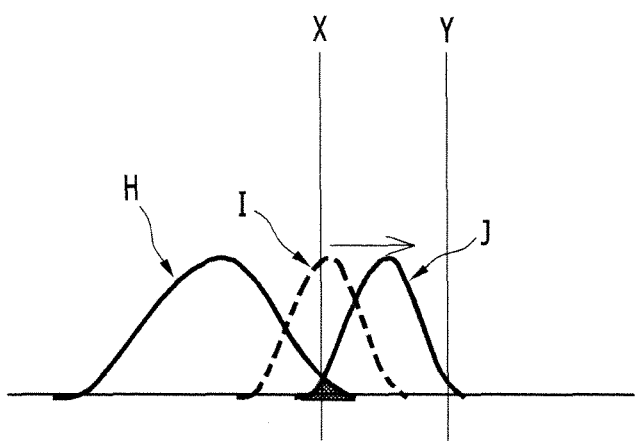
FIG. 3 is a graph illustrating a change of a valve profile of an engine that can implement CDA according to the first exemplary embodiment of the present invention.
Figure 4:
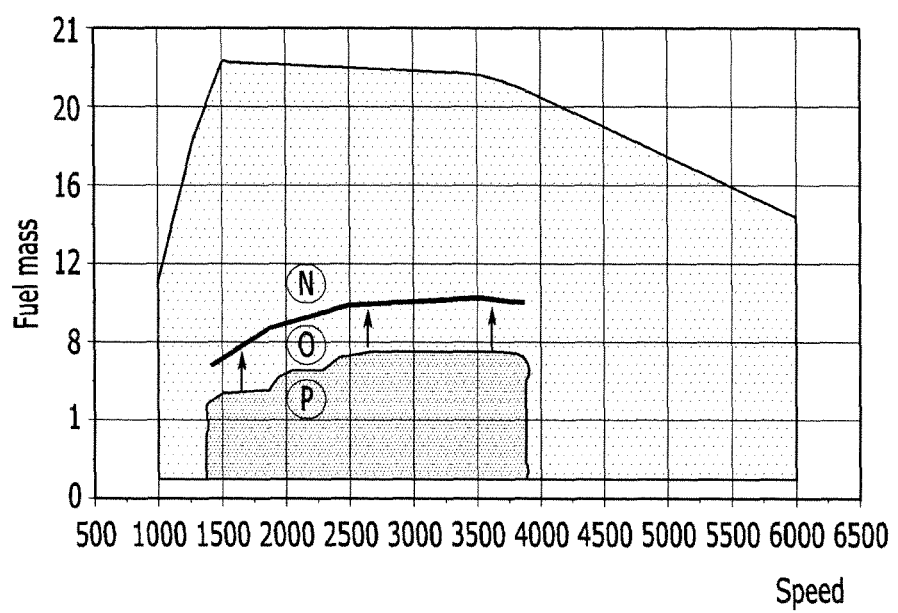
FIG. 4 is a graph illustrating an operation area of an engine that can implement CDA according to the first exemplary embodiment of the present invention.

FIG. 3 is a graph illustrating a change of a valve profile of an engine that can implement CDA according to a first exemplary embodiment of the present invention, and FIG. 4 is a graph illustrating an operation area of an engine that can implement CDA according to a first exemplary embodiment of the present invention.

Referring to FIGS. 1 to 4, when an operation state of the engine 10 is changed from a predetermined first high load state to a predetermined low load state, the controller 60 controls the CDA apparatus 40 to operate in the CDA mode and controls the variable valve duration apparatus 22 to operate in a short duration mode.

Here, the predetermined first high load state may be an area N and an area O of FIG. 4, and the low load state may be an area P.

Accordingly, as shown in FIG. 2, even while increasing an intake air amount of the first and fourth cylinders #1 and #4, a relative increase of a valve overlapping segment can be suppressed and thus a relative increase of an EGR gas is suppressed and fuel consumption efficiency can be enhanced.

In this case, the controller 60 may control operation of the variable valve timing mechanism 50 to advance timing of the intake valve, thereby increasing an intake inflow amount.

When an operation state of the engine 10 is changed from the predetermined low load state to a predetermined second high load state, the controller 60 may delay the variable valve timing mechanism 50.

When an operation state of the engine 10 is changed from the predetermined low load state, i.e., an area P to the predetermined second high load state, for example, an area O, as shown in FIG. 3, the controller 60 may control the CDA apparatus 40 to operate in the CDA mode and delay the variable valve timing mechanism 50 in a state in which the variable valve duration apparatus 22 is controlled to operate in the short duration mode. For example, because closing timing of an intake valve of the first and fourth cylinders #1 and #4 may be delayed adjacent to bottom dead center Y, an intake air amount may be further increased.

When an operation state of the engine 10 is changed to a predetermined third high load state, for example, an area N, the controller 60 controls the CDA apparatus 40 to operate in the general operation mode and controls the variable valve duration apparatus 22 to operate in the long duration mode.

The engine 10 that can implement the CDA according to the first exemplary embodiment of the present invention controls a profile of an intake valve of a cylinder that is not deactivated in the CDA operation mode with the short duration to relatively reduce a valve overlapping segment and can thus enhance fuel consumption.

Further, the engine 10 that can implement the CDA according to the first exemplary embodiment of the present invention can relatively extend the CDA operation area and can thus enhance fuel consumption.

Figure 5:
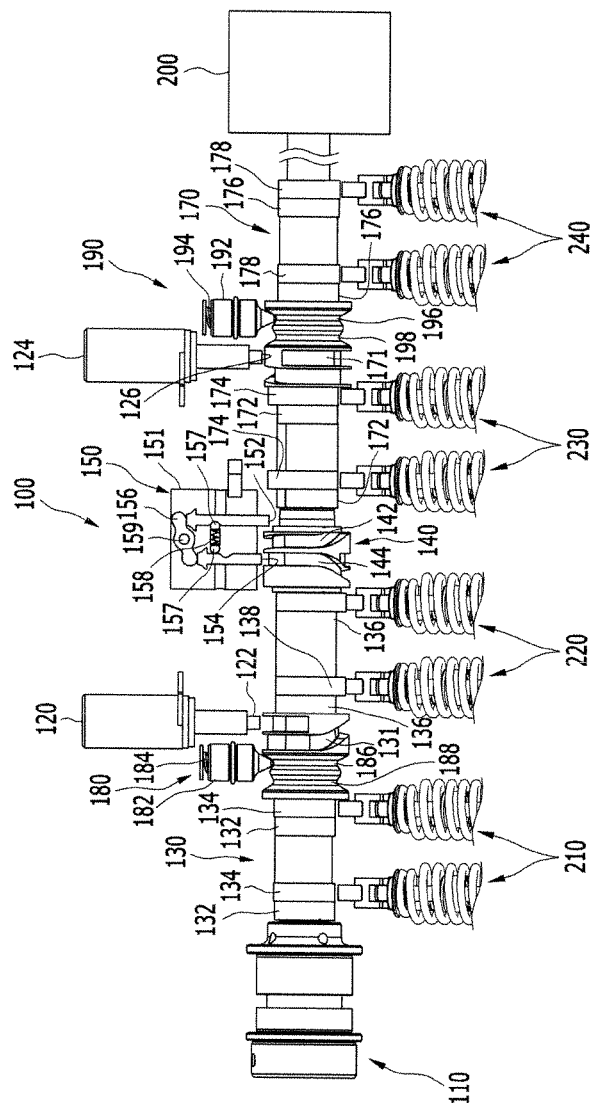
FIG. 5 is a diagram illustrating an intake CDA/variable valve duration apparatus that can be applied to an engine that can implement CDA according to a second exemplary embodiment of the present invention.
Figure 6:
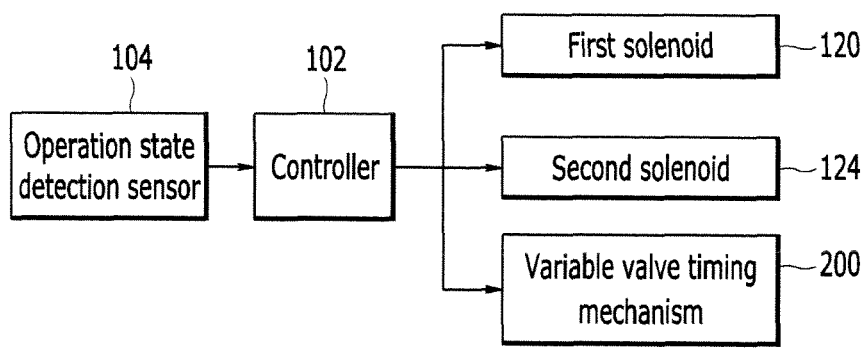
FIG. 6 is a block diagram illustrating an engine that can implement CDA according to the second exemplary embodiment of the present invention.
Figure 7:
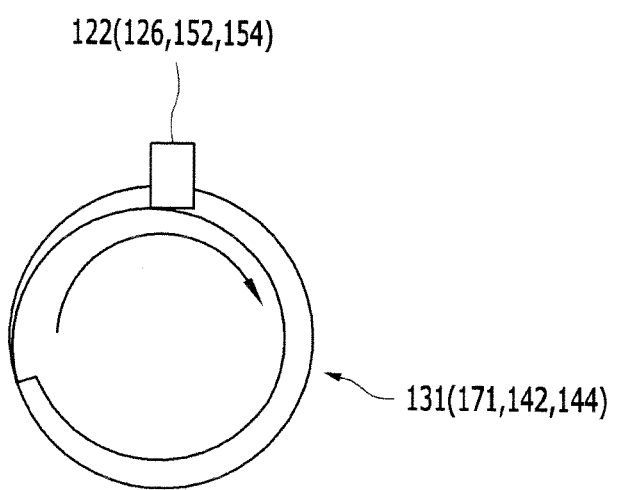
FIG. 7 is a cross-sectional view illustrating a guide groove of an intake CDA/variable valve duration apparatus that can be applied to an engine that can implement CDA according to the second exemplary embodiment of the present invention.

FIG. 5 is a diagram illustrating an intake CDA/variable valve duration apparatus that can be applied to an engine that can implement the CDA according to the second exemplary embodiment of the present invention, FIG. 6 is a block diagram illustrating an engine that can implement the CDA according to the second exemplary embodiment of the present invention, and FIG. 7 is a cross-sectional view illustrating a guide groove of an intake CDA/variable valve duration apparatus that can be applied to an engine that can implement CDA according to the second exemplary embodiment of the present invention.

Referring to FIGS. 5 to 7, an engine that can implement CDA according to an exemplary embodiment or a plurality of exemplary embodiments of the present invention includes a controller 102 that controls operation of an intake CDA/variable valve duration apparatus 100 according to an operation state of the intake CDA/variable valve duration apparatus 100 and an engine that are provided with the intake camshaft to implement a general operation mode and a CDA mode of an intake valve of a plurality of cylinders, an intake camshaft 110, and any one cylinder of the plurality of cylinders, and to implement a long duration mode and a short duration mode of an intake valve of a cylinder neighboring the cylinder.

The intake CDA/variable valve duration apparatus 100 includes a first cam unit 130 that can move in an axial direction of the intake camshaft 110 on the intake camshaft 110 and that rotates together with the intake camshaft 110, in which a first long duration cam 134 and a first short duration cam 132 are formed at one side thereof, and in which a first general cam 138 and a first CDA cam 136 are formed at the other side thereof, a first solenoid 120 that selectively moves the first cam unit 130 in a first direction, for example, in a right direction of the drawing, a second cam unit 170 that can move in an axial direction of the intake camshaft 110 on the intake camshaft 110, that rotates together with the intake camshaft 110, in which a second general cam 174 and a second CDA cam 172 are formed at one side thereof, and in which a second long duration cam 178 and a second short duration cam 176 are formed at the other side thereof, a second solenoid 124 that selectively moves the second cam unit 170 in a second direction, for example, in a left direction of the drawing, and an interlocking unit that is disposed between the first and second cam units 130 and 170 and that pushes the second cam unit 170 or the first cam unit 130 by moving by a movement of the first cam unit 130 or the second cam unit 170, wherein the controller 102 may control operation of the first solenoid 120 or the second solenoid 124 according to an operation state of the engine.

The first and second long duration cams 134 and 178, the first and second short duration cams 132 and 176, the first and second general cams 138 and 174, and the first and second CDA cams 136 and 172 may be disposed in order of the first short duration cam 132, the first long duration cam 134, the first CDA cam 136, the first general cam 138, the second CDA cam 172, the second general cam 174, the second short duration cam 176, and the second long duration cam 178.

In the first cam unit 130, a first guide groove 131 in which an operation rod 122 of the first solenoid 120 is selectively inserted to push the first cam unit 130 in a first direction is formed, and in the second cam unit 170, a second guide groove 171 in which an operation rod 126 of the second solenoid 124 is selectively inserted to push the second cam unit 170 in a second direction is formed.

The interlocking unit includes an operation unit 150 including selectively protruded first and second operation pins 152 and 154, and a moving body 140 in which first and second moving grooves 142 and 144 that selectively insert the first and second operation pins 152 and 154 are formed.

In a state in which the first operation pin 152 is protruded, when the first cam unit 130 pushes the moving body 140, the first operation pin 152 is inserted into the first moving groove 142 and the moving body 140 moves to push the second cam unit 170.

In a state in which the second operation pin 154 is protruded, when the second cam unit 170 pushes the moving body 140, the second operation pin 154 is inserted into the second moving groove 144 and the moving body 140 moves to push the first cam unit 130.

The operation unit 150 further includes an operation unit housing 151 in which the first and second operation pins 152 and 154 are mounted, and an intermediate pin 156 that is hinge coupled to the operation unit housing 151 through a hinge pin 159 and that has respective ends contacting the first and second operation pins 152 and 154 and that enables either one of the first and second operation pins 152 and 154 to protrude.

A stopper ball 157 and a ball spring 158 are provided between the first and second operation pins 152 and 154 to limit movement of the first and second operation pins 152 and 154.

As shown in FIG. 7, one end of the first guide groove 131 is formed in a spiral shape so that the operation rod 122 of the first solenoid 120 returns to an original location. That is, in a state in which the first cam unit 130 rotates, when the operation rod 122 of the first solenoid 120 protrudes and is inserted into the first guide groove 131, the first cam unit 130 moves, and the operation rod 122 of the first solenoid 120 is returned to an original location by a shape of the first guide groove 131.

Similarly, the second guide groove 171 and the first and second moving grooves 142 and 144 are formed in a spiral shape, and by the second solenoid operation rod 126, the first operation pin 152, and the second operation pin 154, after the first cam unit 130 and the moving body 140 are moved, the second solenoid operation rod 126, the first operation pin 152, and the second operation pin 154 may be returned to an original location.

In the first and second cam units 130 and 170, first and second stopper grooves 186 and 188, and 196 and 198, are formed, and the engine further includes stopper units 180 and 190 that are selectively inserted into the stopper grooves 186 and 188, and 196 and 198, to prevent the first and second cam units 130 and 170 from moving in an axial direction of the camshaft 110 after an operation mode is changed.

The stopper units 180 and 190 include stopper bodies 182 and 192 that are selectively inserted into the first and second stopper grooves 186 and 188, and 196 and 198, and stopper springs 184 and 194 that elastically support the stopper bodies 182 and 192, respectively.

The engine has first, second, third, and fourth cylinders that are sequentially formed, the first long duration cam 134 and the first short duration cam 132 of the first cam unit 130 are disposed at the first cylinder, the first general cam 138 and the first CDA cam 136 are disposed at the second cylinder, the second general cam 174 and the second CDA cam 172 are disposed at the third cylinder, and the second long duration cam 178 and the second short duration cam 176 are disposed at the fourth cylinder.

In FIG. 5, the cylinders are not shown, but a first valve opening and closing unit 210 that selectively contacts the first long duration cam 134 or the first short duration cam 132 is disposed at the first cylinder, a second valve opening and closing unit 220 that contacts the first general cam 138 or the first CDA cam 136 is disposed at the second cylinder, a third valve opening and closing unit 230 that contacts the second general cam 174 or the second CDA cam 172 is disposed at the third cylinder, and a fourth valve opening and closing unit 240 that contacts the second long duration cam 178 or the second short duration cam 176 is disposed at the fourth cylinder.

The engine further includes a variable valve timing controller 200 that varies valve timing of the intake valve of the each cylinder.

FIGS. 8 to 13 are diagrams illustrating operation of an intake CDA/variable valve duration apparatus that can be applied to an engine that can implement CDA according to the second exemplary embodiment of the present invention.

Hereinafter, operation of an intake CDA/variable valve duration apparatus that can be applied to an engine that can implement CDA according to the second exemplary embodiment of the present invention will be described with reference to FIGS. 5 to 13.

In FIG. 5, the intake CDA/variable valve duration apparatus 100 operates in the general/long duration mode, and for example, an operation state of an engine may be an area N of FIG. 4.

When an operation state of a vehicle is changed to a low load condition, for example, the area O of FIG. 4, according to a detection signal of an operation state detection sensor 104, the controller 102 controls operation of first and second solenoids 120 and 124 to change an operation mode of the intake CDA/variable valve duration apparatus 100 to the CDA/short duration mode.

The operation state detection sensor 104 may be, for example, a vehicle speed sensor, an inhibitor switch, an atmosphere temperature sensor, a coolant temperature sensor, or an accelerator opening sensor, and may be various sensors that can determine a load of the vehicle.

Figure 8:
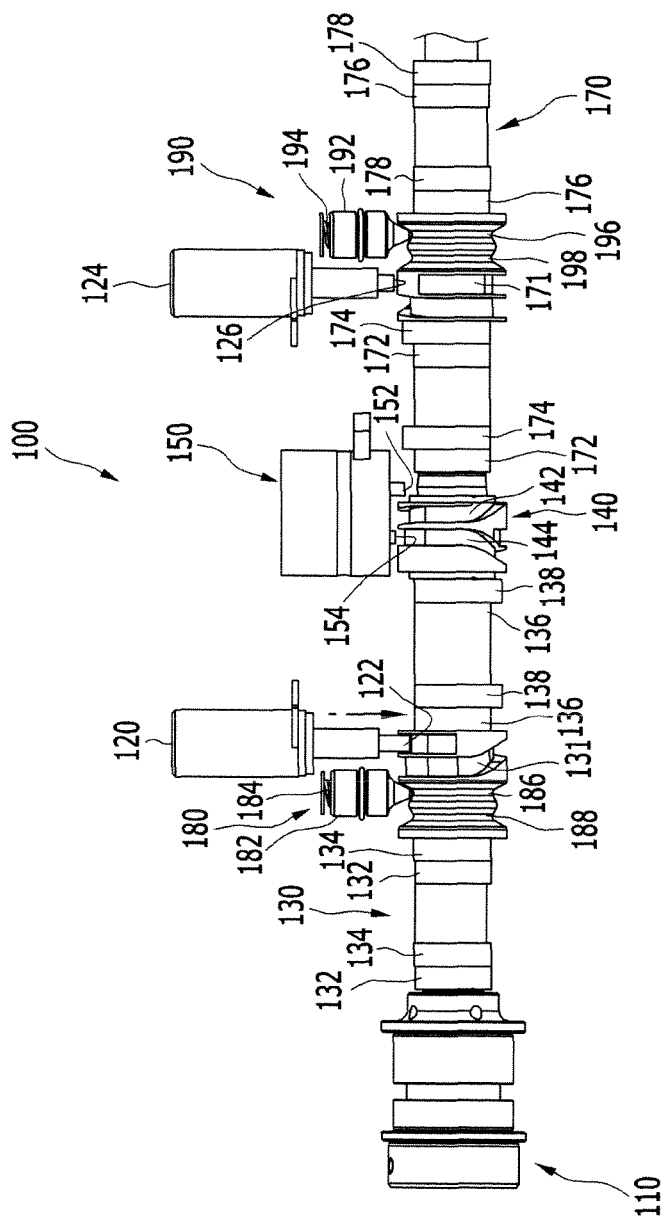
FIGS. 8 to 13 are diagrams illustrating operation of an intake CDA/variable valve duration apparatus that can be applied to an engine that can implement CDA according to the second exemplary embodiment of the present invention.
Figure 9:
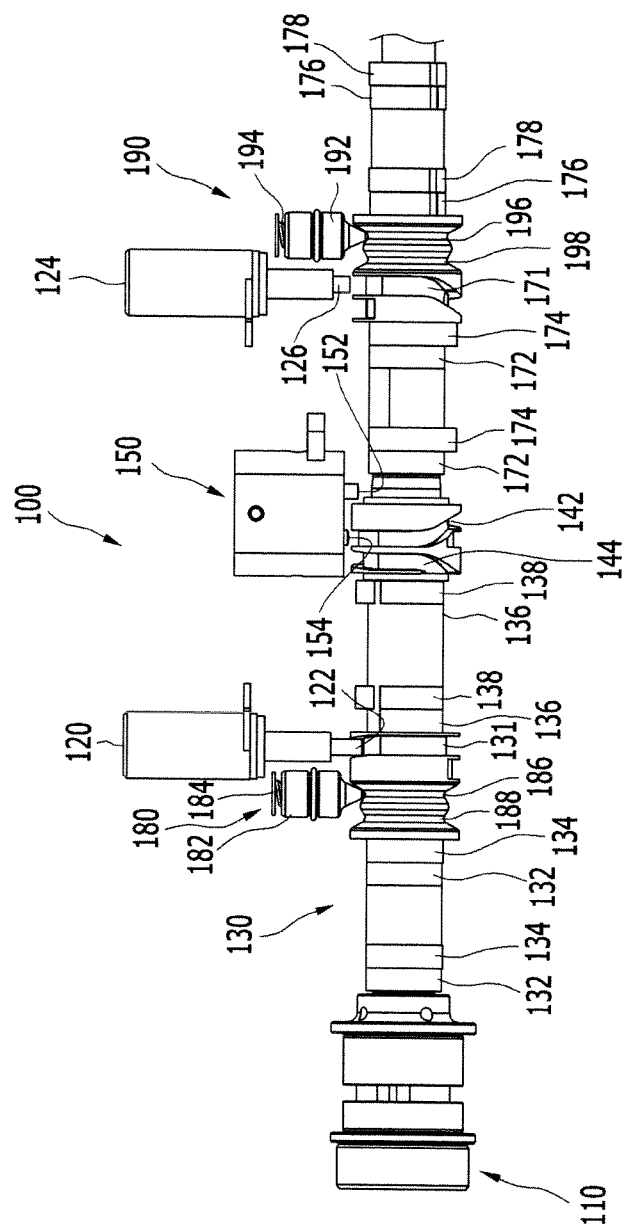

As shown in FIG. 8, as the first solenoid 120 operates, the first solenoid operation rod 122 protrudes to be inserted into the first guide groove 131, and as shown in FIG. 9, the first cam unit 130 moves.

Figure 10:
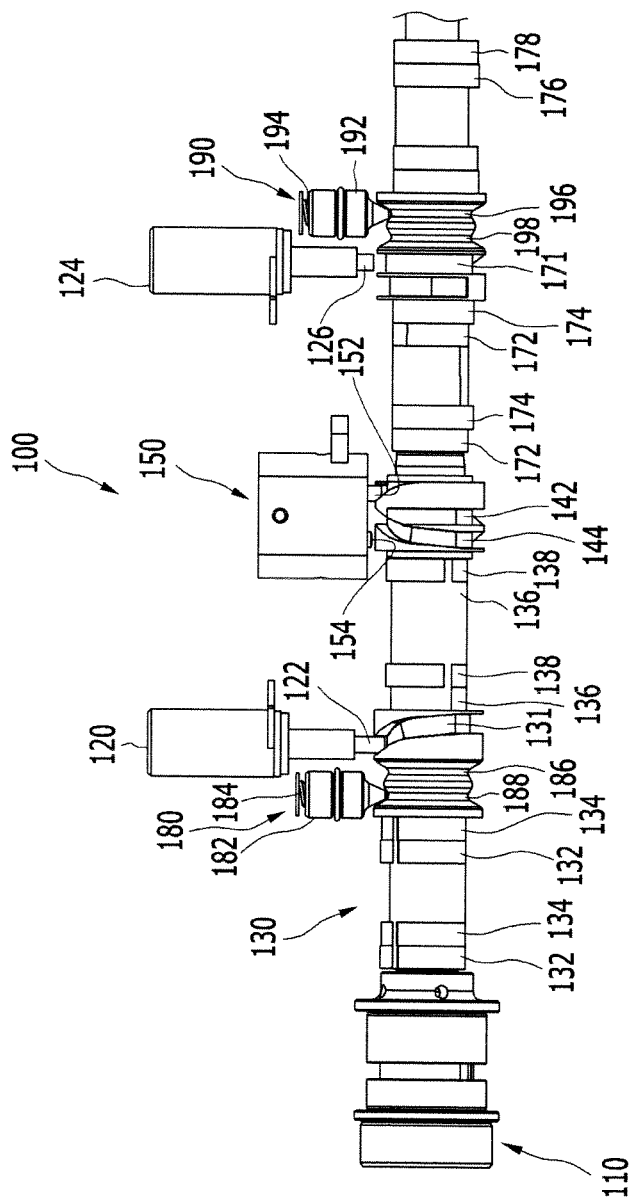
Figure 11:
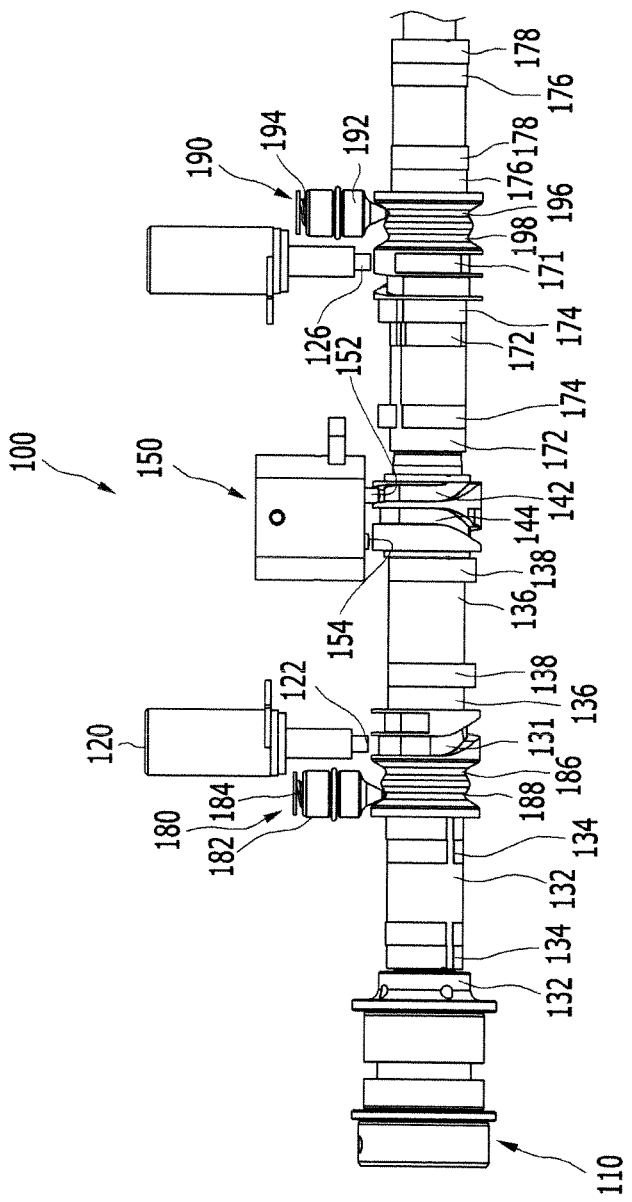

As shown in FIG. 10, when the first cam unit 130 moves to push the moving body 140, the first operation pin 152 is engaged with the first moving groove 142, and as shown in FIG. 11, while the moving body 140 pushes the second cam unit 170, the moving body 140 moves to the right side of the drawing, and the first solenoid operation rod 122 is separated from the first guide groove 131.

Figure 12:
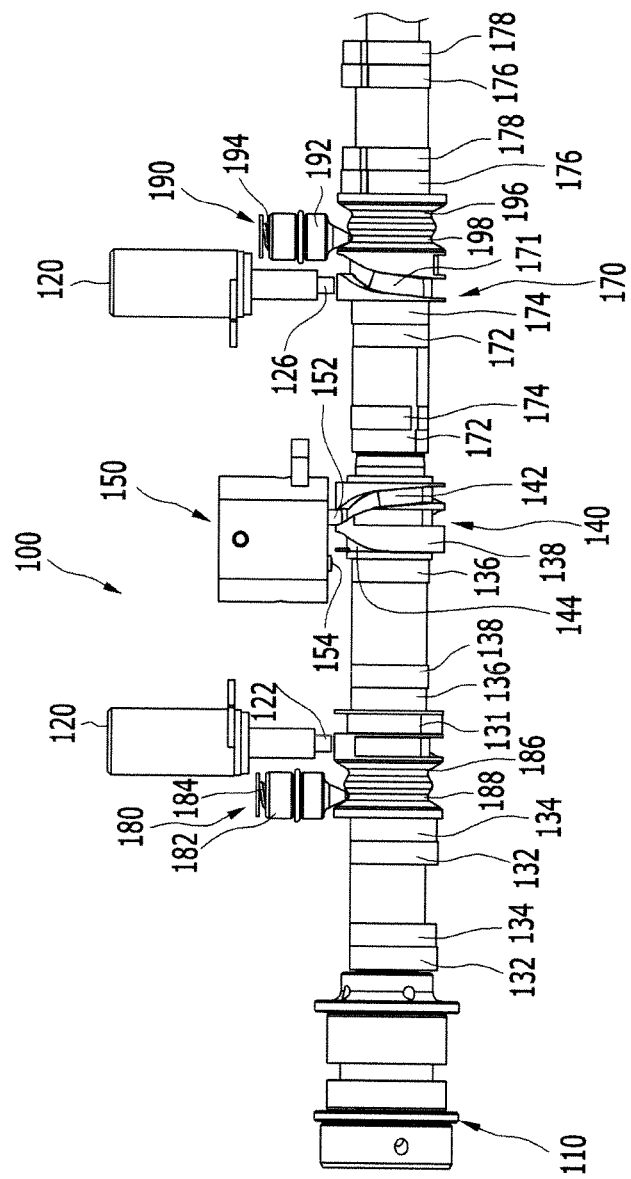
Figure 13:
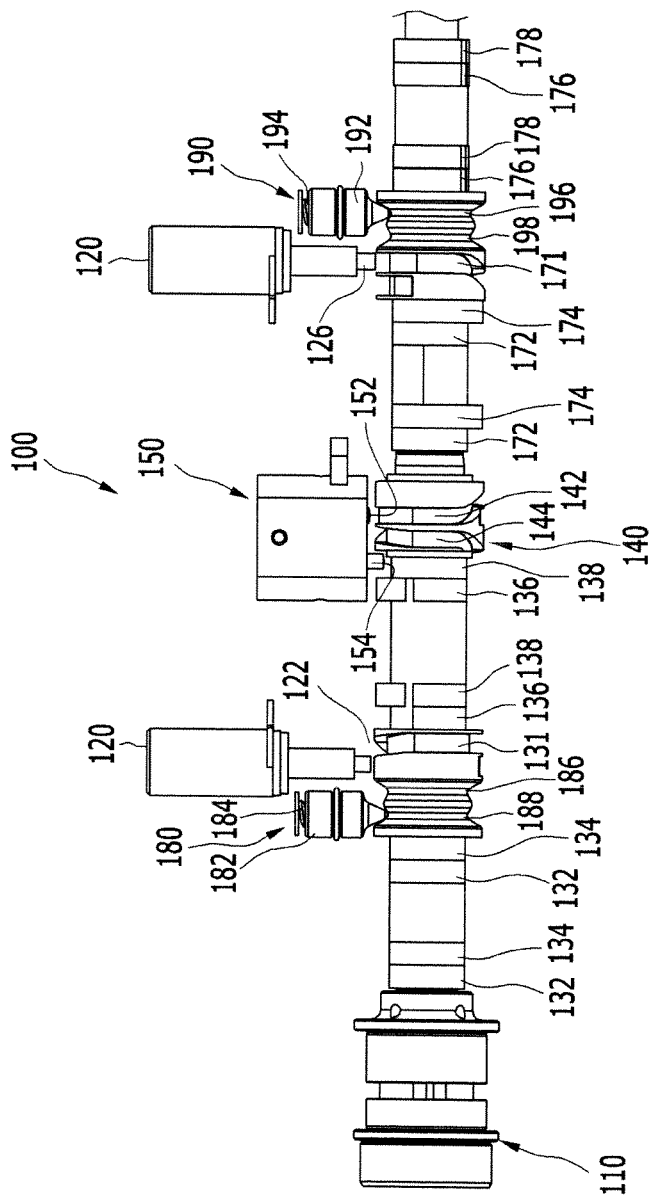

As shown in FIG. 12, when separation of the first solenoid operation rod 122 from the first guide groove 131 is complete, and as shown in FIG. 13, when movement of the second cam unit 170 is complete, the first operation pin 152 is located at an original location and the second operation pin 154 protrudes through the intermediate pin 156. In this case, the second operation pin 154 is not engaged with the second moving groove 144.

A process of changing a mode of the intake CDA/variable valve duration apparatus 100 from the CDA mode to the general mode is performed in a reverse order of the foregoing order by operation of the second solenoid 124.

Figure 14:
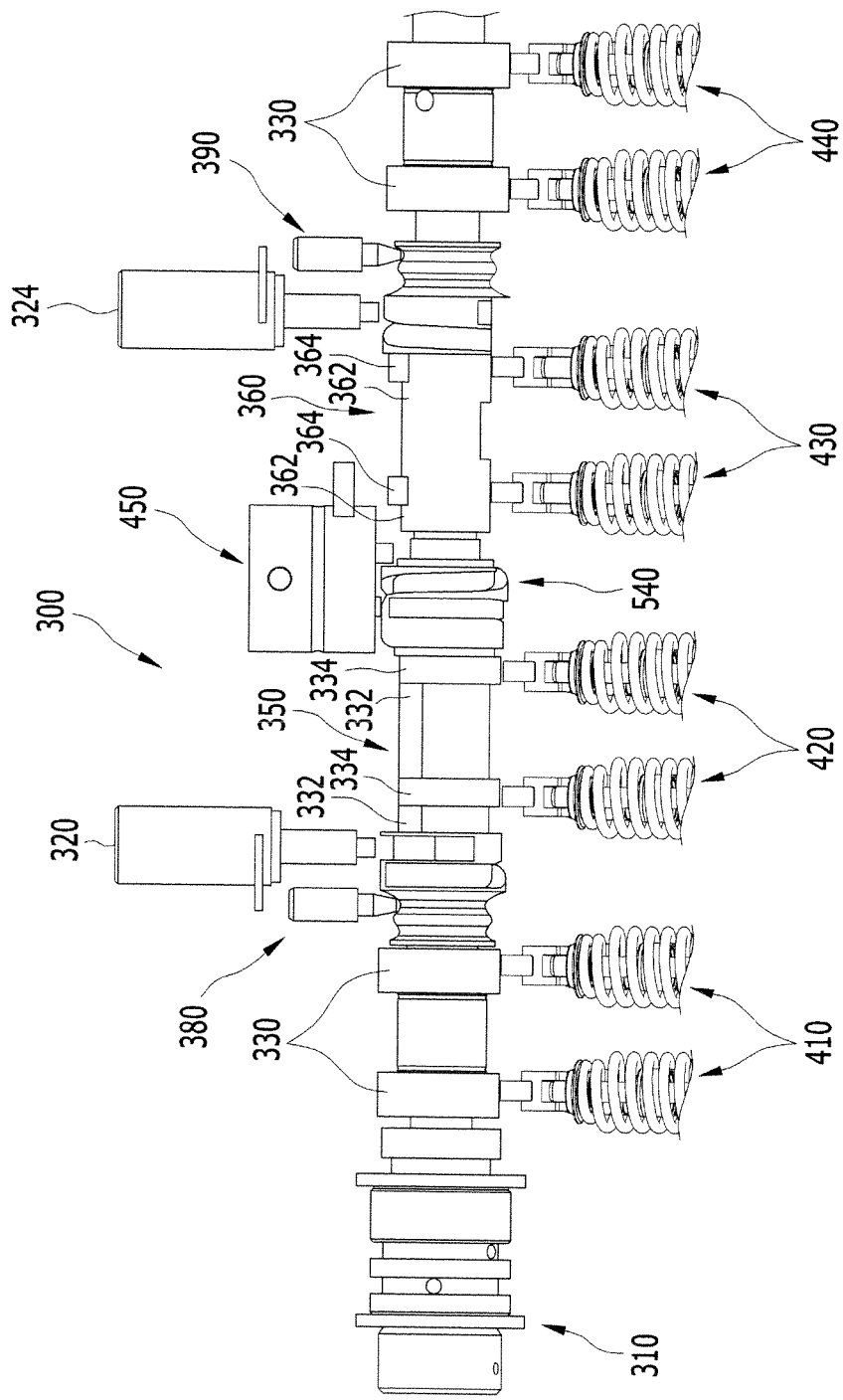
FIG. 14 is a diagram illustrating an exhaust CDA apparatus that can be applied to an engine that can implement CDA according to the second exemplary embodiment of the present invention.
Figure 15:
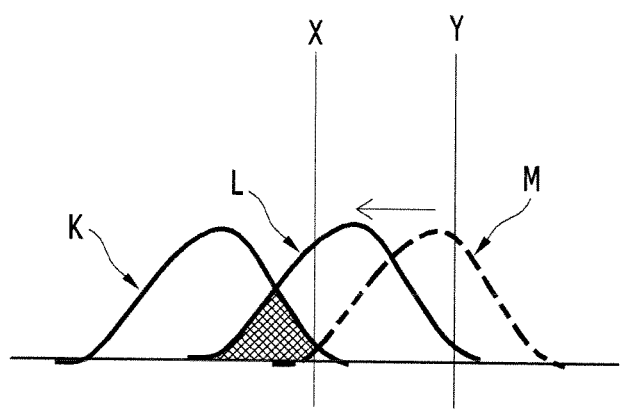
FIG. 15 is a graph illustrating a valve profile when converting an operation mode of a general engine that can implement CDA.

FIG. 14 is a diagram illustrating an exhaust CDA apparatus that can be applied to an engine that can implement the CDA according to the second exemplary embodiment of the present invention.

The engine may further include an exhaust CDA apparatus 300 that implements a general operation mode and the CDA mode of an exhaust camshaft 310 and an exhaust valve of the second and third cylinders, and that opens and closes an exhaust valve of the first and fourth cylinders.

The engine includes first, second, third, and fourth exhaust opening and closing units 410, 420, 430, and 440 that are disposed at the first, second, third, and fourth cylinders, and an exhaust cam 330 that contacts the first and fourth exhaust opening and closing units 410 and 440 is provided to the exhaust camshaft 310.

Further, first and second exhaust cam units 350 and 360 are provided to the exhaust camshaft 310 to move in an axial direction of the exhaust camshaft 310, and an exhaust CDA cam 332 and an exhaust general cam 334 that selectively contact the second and third exhaust opening and closing units 420 and 430 are formed to the first and second exhaust cam units 350 and 360.

An exhaust moving body 540 is slidably provided and an exhaust operation unit 450 is provided between the first and second exhaust cam units 350 and 360.

Third and fourth solenoids 320 and 324 are provided to selectively move the first and second exhaust cam units 350 and 360, and stopper units 380 and 390 are provided to prevent the first and second exhaust cam units 350 and 360 from moving in an axial direction of the camshaft 110 after an operation mode is changed.

A detailed operation of the exhaust CDA apparatus 300 is the same as that of the intake CDA/variable valve duration apparatus 100, except that an exhaust valve profile of first and fourth cylinders is not changed and thus a detailed description thereof will be omitted.

In a state in which the intake CDA/variable valve duration apparatus 100 is operated to implement the CDA mode and the short duration mode, when an operation state of the engine is changed to a predetermined high load state, by operating the intake CDA/variable the valve timing mechanism 200, the controller 102 may delay timing of the intake valve. Accordingly, as described in FIGS. 2 to 4, a profile of an intake valve of a cylinder that is not deactivated in a CDA operation mode of some cylinders is implemented with a short duration, and thus a valve overlapping segment is relatively reduced and fuel consumption efficiency can thus be enhanced.

Further, by operating the valve timing controller 200, timing of the intake valve can be delayed and thus a CDA operation area can be relatively extended and fuel consumption efficiency can be further enhanced.

While this disclosure has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine for performing cylinder deactivation (CDA), the engine comprising:
    a plurality of cylinders;
    an intake camshaft;
    an intake CDA/variable valve duration apparatus that is provided in the intake camshaft to perform a general operation mode and a CDA mode of an intake valve of one cylinder of the plurality of cylinders and to perform a long duration mode and a short duration mode of an intake valve of a cylinder neighboring the one cylinder;
    a controller that controls operation of the intake CDA/variable valve duration apparatus according to an operation state of the engine; and
    a variable valve timing controller that varies valve timing of the intake valve of each cylinder,
    wherein the controller controls operation of the valve timing controller, and the controller delays timing of the intake valve by operating the intake CDA/variable valve timing controller when an operation state of the engine is changed to a predetermined high load state, in a state in which the intake CDA/variable valve duration apparatus operates to implement the CDA mode and the short duration mode of the intake valve,
    wherein the intake CDA/variable valve duration apparatus comprises:
    a first cam unit that can move in an axial direction of the intake camshaft on the intake camshaft and that rotates together with the intake camshaft, and in which a first long duration cam and a first short duration cam are formed at one side thereof and in which a first general cam and a first CDA cam are formed at another side thereof;
    a first solenoid that selectively moves the first cam unit in a first direction;
    a second cam unit that can move in the axial direction of the intake camshaft on the intake camshaft and that rotates together with the intake camshaft, and in which a second general cam and a second CDA cam are formed at one side thereof and in which a second long duration cam and a second short duration cam are formed at another side thereof;
    a second solenoid that selectively moves the second cam unit in a second direction; and
    an interlocking unit that is disposed between the first and second cam units and that is moved by movement of the first cam unit or the second cam unit to push the second cam unit or the first cam unit,
    wherein the controller controls operation of the first solenoid or the second solenoid according to an operation state of the engine.

2. The engine of claim 1, wherein the first and second long duration cams, the first and second short duration cams, the first and second general cams, and the first and second CDA cams are disposed in the order of the first short duration cam, the first long duration cam, the first CDA cam, the first general cam, the second CDA cam, the second general cam, the second short duration cam, and the second long duration cam.

3. The engine of claim 1, wherein in the first cam unit, a first guide groove that selectively inserts an operation rod of the first solenoid to push the first cam unit in the first direction is formed, and in the second cam unit, a second guide groove that selectively inserts an operation rod of the second solenoid to push the second cam unit in the second direction is formed.

4. The engine of claim 1, wherein the interlocking unit comprises:
    an operation unit comprising first and second operation pins that protrude selectively; and
    a moving body having first and second moving grooves that selectively insert the first and second operation pins.

5. The engine of claim 4, wherein the first operation pin is inserted into the first moving groove and the moving body moves to push the second cam unit when the first cam unit pushes the moving body, in a state in which the first operation pin protrudes.

6. The engine of claim 4, wherein the second operation pin is inserted into the second moving groove and the moving body moves to push the first cam unit when the second cam unit pushes the moving body, in a state in which the second operation pin is protruded.

7. The engine of claim 4, wherein the operation unit further comprises:
    an operation unit housing in which the first and second operation pins are mounted; and
    an intermediate pin that is hinge coupled to the operation unit housing and that has respective ends contacting the first and second operation pins and that enables either one of the first and second operation pins to protrude.

8. The engine of claim 1, wherein in the first and second cam units, first and second stopper grooves, respectively, are formed, and the engine further comprises a stopper unit that is selectively inserted into the stopper groove to prevent the first and second cam units from moving in an axial direction of the camshaft after an operation mode is changed.

9. The engine of claim 8, wherein the stopper unit comprises:
    a stopper body that is selectively inserted into the first and second stopper grooves; and
    a stopper spring that elastically supports the stopper body.

10. The engine of claim 1, wherein the engine is an engine in which first, second, third, and fourth cylinders are sequentially formed, the first long duration cam and the first short duration cam of the first cam unit are disposed at the first cylinder, the first general cam and the first CDA cam are disposed at the second cylinder, the second general cam and the second CDA cam are disposed at the third cylinder, and the second long duration cam and the second short duration cam are disposed at the fourth cylinder.

11. The engine of claim 10, further comprising:
    an exhaust camshaft; and
    an exhaust CDA apparatus that performs a general operation mode and a CDA mode of an exhaust valve of the second and third cylinders and that opens and closes an exhaust valve of the first and fourth cylinders.

* * * * *